US008391271B2

(12) United States Patent
Mo et al.

(10) Patent No.: US 8,391,271 B2
(45) Date of Patent: Mar. 5, 2013

(54) TIME SYNCHRONIZATION FOR DISTRIBUTED MOBILE AD HOC NETWORKS

(75) Inventors: Shaomin Mo, Montville, NJ (US); John A. Gu, Rockaway, NJ (US); Jessica Y. Hsu, Washington, DC (US); Ming Luo, Fairfax, VA (US); Reza Ghanadan, Berkeley Heights, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 447 days.

(21) Appl. No.: 12/727,899

(22) Filed: Mar. 19, 2010

(65) Prior Publication Data

US 2010/0238890 A1 Sep. 23, 2010

Related U.S. Application Data

(60) Provisional application No. 61/161,563, filed on Mar. 19, 2009.

(51) Int. Cl.
*H04J 3/06* (2006.01)
(52) U.S. Cl. .......................... 370/350; 370/462; 370/509
(58) Field of Classification Search ........................ None
See application file for complete search history.

(56) References Cited

U.S. PATENT DOCUMENTS

| 6,980,522 | B2 * | 12/2005 | Boyle ........................... 370/252 |
| 7,656,851 | B1 | 2/2010 | Ghanadan et al. |
| 7,847,734 | B2 * | 12/2010 | Wu ................................ 342/465 |
| 2010/0124205 | A1 | 5/2010 | Ghanadan et al. |
| 2010/0124207 | A1 | 5/2010 | Ghanadan et al. |

OTHER PUBLICATIONS

M. Luo, et al., Distributed Medium Access Control for Multiple Hop Tactical Networks, IEEE MILCOM (2008).
B. Sundararaman, et al., Clock Synchronization for Wireless Sensor Networks: A Survey, Univ. of Illinois, Dep't of Computer Science (Mar. 22, 2005).
J. Elson, et al., Fine-Grained Network Time Synchronization using Reference Broadcasts, Proc. of 5th Symp. on Operating Systems Design & Implementation (Dec. 2002), at 147-63.
F. Sivrikaya, et al., Time Synchronization in Sensor Networks: A Survey, IEEE Network (Jul./Aug. 2004), at pp. 45-50.

(Continued)

*Primary Examiner* — Kwang B Yao
*Assistant Examiner* — Alex Skripnikov
(74) *Attorney, Agent, or Firm* — Leo Zucker; Daniel J. Long

(57) ABSTRACT

Time synchronization among nodes in a wireless mobile ad hoc network (MANET) is obtained using a cross layer approach. Each node maintains a routing table that contains entries corresponding to other nodes of the network that are one or more hops away from the node, and topology messages are exchanged periodically among the nodes in order to update their routing tables. A network master node is selected, and remaining nodes that are one or more hops away from the master node are defined as slave nodes. The master node includes master timing information in the topology messages it transmits. The timing information is concatenated to include a first time (T1) at which a topology message was received by the master from each of the slave nodes, and a second time (td) at which the master node transmits a topology message after receiving all the topology messages from the slave nodes.

10 Claims, 6 Drawing Sheets

OTHER PUBLICATIONS

M. L. Sichitiu, et al., Simple, Accurate Time Synchronization for Wireless Sensor Networks, IEEE WCNC, New Orleans (Mar. 2003), at pp. 1266-1273.

C. H. Rentel, et al., A Mutual Network Synchronization Method for Wireless Ad Hoc and Sensor Networks, IEEE Transactions on Mobile Computing, vol. 7, No. 5 (May 2008), at pp. 633-646.

K. Guan, et al., Adaptive Management of Scalable Mobile Ad-hoc Networks with Non-homogeneous Topology, IEEE MILCOM, Orlando, FL (Oct. 2007), at pp. 1-7.

A. Boukerche, Algorithms and Protocols for Wireless and Mobile Networks (CRC/Hall 2004), chapter by L. Bao, et al., Distributed Channel Access Scheduling for Ad Hoc Networks, at pp. 45-75.

* cited by examiner

TIME SYNCHRONIZATION FOR DISTRIBUTED MOBILE AD HOC NETWORKS

CROSS REFERENCE TO RELATED APPLICATION

This application claims priority under 35 U.S.C. Sec. 119 (e) of U.S. Provisional Patent Application No. 61/161,563 filed Mar. 19, 2009, titled Network Synchronization For Distributed MANET, and which is incorporated herein by reference.

BACKGROUND OF THE INVENTION

1. Field of the Invention

The present invention relates to wireless ad hoc networks, and particularly to obtaining time synchronization among member nodes in a mobile ad hoc network (MANET).

2. Discussion of the Known Art

Time synchronization is a critical requirement for wireless multi-hop mobile networks, especially tactical military networks. Such networks are typically characterized by rapidly changing topologies and high traffic loads, and present a constant challenge for traffic coordination in order to achieve efficient channel utilization. It is widely accepted that time division multiple access (TDMA) technology can improve channel access capacity over other contention-based access protocols. In TDMA systems, clear time slots and schedules are defined to ensure that member nodes transmit only during their assigned slots and that their transmissions do not overlap. Due to potential improvements in channel capacity and security requirements, TDMA channel access is widely used in military networks. Because all nodes throughout the network must operate according to a common time scale, the ability of each node to synchronize, i.e., to adjust the time at each node in order to conform with a common timing interface, is a fundamental requirement for tactical TDMA networks if collision free communications are to be maintained.

When applied to tactical MANETs, existing time synchronization protocols are limited by hardware and environmental restrictions. See, B. Kusy, et al., "Elapse Time on Arrival: A simple and versatile primitive for canonical time synchronization services", International Journal of Ad Hoc and Ubiquitous Computing, 2(1) (2006) and B. Kusy, et al., "Tracking Mobile Nodes Using RF Doppler Shifts", ACM Sensys Conference (2007), both of which are incorporated by reference. In addition, many existing techniques cannot satisfy all of the following requirements for tactical MANETs:

1. Scalable multiple hop networks
2. Rapid topology change from node mobility
3. Synchronization accuracy of 1 us See also, F. Sivrikaya, et al., "Time synchronization in sensor networks: A Survey", IEEE Network, at pages 45-50 (July/August 2004); B. Sundararaman, et al., "Clock synchronization for wireless sensor networks: a survey", Ad Hoc Networks (Elsevier), vol. 3, no. 3, pages 281 to 323 (May 2005); M. L. Sichitiu, et al., "Simple, Accurate Time Synchronization for Wireless Sensor networks", WCNC (2003); J. Elson, et al., "Fine-grained network time synchronization using reference broadcasts", Proc. of 5$^{th}$ Symp. Operating Systems Design and Implementation (OSDI), Boston, Mass. (December 2002); and C. H. Rentel, et al., "A Mutual Network Synchronization Method for Wireless Ad Hoc and Sensor networks", IEEE Transactions on Mobile Computing, vol. 7, no. 5, at pages 633 to 646 (May 2008), all of which are incorporated by reference.

For example, a so-called Reference Broadcast Synchronization (RBS) avoids the impact of processing delays at the transmitter side, but introduces propagation delays in clock skew and time offset estimation by about 1 us for each 300 meters. See, J. Elson, et al, "Fine-grained network time synchronization using reference broadcasts", cited above. Thus, while RBS may work well for sensor networks, it cannot be used reliably in MANETs. Other protocols rely exclusively on deterministic algorithms that enable quantification of an upper bound on the error in clock offset estimation, but they are vulnerable to a single node failure.

Clock-Sampling Mutual Network Synchronization (CS-MNS) is a distributed algorithm that does not rely on structured networks and, thus, may avoid a single node failure. See, C. H. Rentel, et al, "Clock-sampling mutual network synchronization for mobile multi-hop wireless ad hoc networks", cited above. In CS-MNS, each node adjusts its timing based on its neighbors' timing so that all nodes converge to a common timing. For example, assume a node n has clock hardware operating at a rate or frequency $f_n$. The node n then uses timestamps it receives in its neighbors' messages to adjust the instant time determined by its clock hardware by a scale factor $\beta_n$ to achieve network time synchronization. Each node in the network then reaches such a state that $\beta_m f_m = \beta_n f_n$ for any m≠n.

It can be seen, however, that CS-MNS may also arrive at other states in which $\alpha\beta_m f_m = \alpha\beta_n f_n$, where α≠1. Thus, if a network has a topology such as shown in FIG. 1, i.e., condensed nodes on two sides and sparse in between, it is possible for the disjoint subnets to settle into two different states, or $\alpha_1 \neq \alpha_2$. The CS-MNS protocol does not address how to resolve this problem if it occurs. In addition to the foregoing issues, many of the known algorithms address network time synchronization only in low traffic load networks, but fail to address operation in mobile and heavy loaded networks such as tactical MANETs.

For a distributed MANET, where there are no advantaged nodes that act as central controllers, time synchronization becomes even more challenging. While many of the known time synchronization protocols are scalable and efficient, they are intended for use in sensor networks and consume valuable channel resources if applied to mobile networks, leading to reduced channel efficiency. Furthermore, many of the algorithms only deal with time synchronization and while they may work well in low traffic load or sensor networks, they cannot operate properly in traffic loaded networks such as MANETs because of contention protocols and packet collisions in the latter.

Table 1, below, illustrates some of the functional and behavioral differences between tactical distributed MANETs and sensor networks, which preclude the effective use of a common time synchronization scheme for both types of networks.

TABLE 1

|  | Tactical Networks | Sensor Networks |
| --- | --- | --- |
| Distance | 0-10's km | <10 meters |
| Mobility | <10 m/s | None |
| Traffic load | Medium-high | low |
| Operation time | Hours | Months |
| Power efficiency | Medium | high |

Distances between adjacent nodes in sensor networks are typically under 10 meters, causing not more than a 30 ns ($30 \times 10^{-9}$ sec.) propagation delay. Such a minimal delay can often be neglected when time synchronization of 1 us ($1 \times 10^{-6}$ sec.) is required. Distances between nodes in MANETs may reach tens of kilometers with about 30 us propagation delays, however. Such larger delays must therefore be considered for accurate time synchronization in MANETs.

Time synchronization is impossible without message exchanges among network nodes. For traffic loaded MANETs, this presents a challenge in scheduling the message transmissions to avoid contention and collision. The problem becomes even worse if mobility is considered. Because the typical operation time of each node in a MANET is much shorter than for nodes in sensor networks, however, power efficiency is not as critical in a MANET as it is for sensor networks.

Basic Scheme for Time Synchronization

As mentioned, a two-way message exchange is needed for the estimation of time offsets to achieve time synchronization in current tactical networks. FIG. 2 depicts a standard handshake algorithm, wherein a slave node estimates its time offset relative to a master node's clock. First, the slave sends a request message at time tx. After receiving the message at T1, the master sends back a reply message at td that includes timestamps of T1 and td. Subsequently, after receiving the reply message at T2, the slave can derive the time offset D by using $$D = \frac{1}{2}(T1 - T2 + td + t_{p2} - t_{p1}) \quad \text{(Eq. 1)}$$

where $t_{p1}$ and $t_{p2}$ denote propagation delay in each direction. For "stationary" channels (i.e., channels whose propagation paths do not change) the round trip propagation delay can be cancelled; $t_{p1} = t_{p2}$, so that $$D = \frac{1}{2}(T_1 - T_2 + td) \quad \text{(Eq. 2)}$$

Thus, in this scheme:
1. Two-way handshaking is needed
2. Propagation effects are cancelled
3. Processing delays in transmitters and receivers still exist With commercial off-the-shelf (COTS) wireless WAN/LAN/PAN chipsets, any processing delay at the transmitter side is primarily attributed to RF processing, which is relatively constant and fixed at the symbol level. Advanced radios have the ability to timestamp messages upon reception at the physical layer, which reduces processing delay to the symbol level at the receiver side as well. See, Y. Eisenberg, et. al, "MUD Enabled Media Access Control for High Capacity, Low-latency Spread Spectrum Communications", IEEE MILCOM, Orlando, Fla. (October 2007).

Eq. 1 above shows that it is the difference in processing delay between the transmitter side and the receiver side and among different vendors' chipsets that affects time offset estimation. Since each of the processing delays is quite small, one may assume that the differences in the delays are even smaller relative to the required estimation accuracy, and that they may be disregarded when estimating time offsets.

When using the conventional two-way message exchange in a network with M nodes, 2M transmissions are therefore required to perform network time synchronization. Incurred overhead then includes the payload of the messages plus packet overhead, such as time for training and headers, etc. In traffic loaded systems, channel access cannot be guaranteed and delay can be uncertain. This causes inaccuracy in estimation. Therefore, there is a need for a network time synchronization protocol for distributed MANETs that minimizes network overhead, and which allows scheduling resolution in a distributed manner.

SUMMARY OF THE INVENTION

According to the invention, a method of obtaining time synchronization among nodes in a wireless mobile ad hoc network (MANET) includes maintaining, at a given node of the network, a routing table containing entries corresponding to other nodes of the network that are one or more hops away from the given node, and periodically exchanging topology messages among nodes of the network in order to update the routing tables at each of the nodes. The method also includes selecting a network master node, and defining remaining nodes that are one or more hops away from the master node as slave nodes. The topology messages transmitted by the master node include master timing information concatenated to include a first time (T1) at which a topology message was received by the master node from each of the slave nodes, and a time (td) at which the master node sends a topology message after receiving all the topology messages from the slave nodes In a preferred embodiment, a distributed scheduling scheme is implemented and maintained for medium access so that the nodes can transmit their topology messages without explicit negotiation. Timestamps from multiple nodes are concatenated and transmitted from the master node in one topology message, thus reducing network overhead. Significantly, time offsets at each node can be estimated even when a message exchange is interrupted, i.e., the exchange does not occur within the same time slot due to distributed scheduling and/or packet loss.

For a better understanding of the invention, reference is made to the following description taken in conjunction with the accompanying drawing and the appended claims.

DETAILED DESCRIPTION OF THE INVENTION

Figure 1:
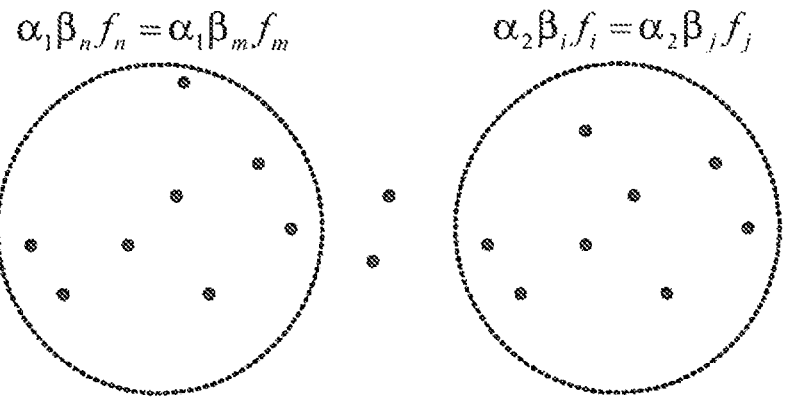
FIG. 1 illustrates two states under a clock-sampling mutual network synchronization (CS-MNS) protocol.

The inventive network time synchronization protocol, referred to herein as Cross-Layer Ad-hoc Network Synchronization (CLANS), is well suited for distributed MANETs including tactical networks in which the following conditions exist:

1. The network is tree-structured, wherein one node acts as network master (M);
2. The inventive CLANS protocol is started after network entry is completed, or existing network nodes determine their layer to the network master; and
3. After network entry, coarse time synchronization is accomplished so that time offsets between the master node and the slave nodes are within a defined limit less than one-half the size of one time slot.

Routing Assumptions

Data routing is a major function in MANETs, wherein finding and maintaining a routing path is the major task. A common practice to accomplish the task includes having each node maintain a current list of its 1-hop neighbors, and having the node share this information with its 1-hop neighbors. See, K. Guan, et. al., "Adaptive Management of Scalable Mobile Ad-hoc Networks with Non-homogeneous Topology", IEEE MILCOM, Orlando, Fla. (October 2007), and M. Luo, et. al., "Distributed Media Access Control for Multiple Hop Tactical Networks", IEEE MILCOM, San Diego, Calif. (November 2008), and U.S. Pat. No. 7,656,851 (Feb. 2, 2010) titled "Adaptive Message Routing for Mobile Ad Hoc Networks", all relevant portions of which are incorporated by reference. In the following description, the 1-hop neighbor update is referred to as a "topology message", and the network nodes distribute their topology update messages periodically to reflect mobility of the nodes and other environmental changes.

Channel Access

Assume that a portion of each network time frame is allocated to the topology messages for route maintenance. Important concerns in wireless communications include contention for channel access, and packet collisions caused by direct neighbors and 2-hop neighbors, or by so-called hidden nodes. Thus, a distributed scheduling protocol such as the known node activation multiple access or NAMA protocol is preferably implemented for transmission of the topology messages in order to achieve contention resolution. See, L. Bao, et al., Distributed Channel Access Scheduling for Ad Hoc Networks, chapter titled "Algorithms and Protocols for Wireless and Mobile Networks", CRC/Hall (2004), and L. Bao, et al., "Distributed Dynamic Channel Access Scheduling for Ad Hoc Networks", JPDC, Special Issue on Wireless and Mobile Ad Hoc Networking and Computing (2002), all relevant portions of which are incorporated herein by reference.

In NAMA, node i first learns the identity of its 2-hop neighbors from the topology messages it receives from its 1-hop neighbors, usually during network entry. If a node has M 1-hop and 2-hop neighbors all together, the node calculates a priority of these M nodes using $$i \cdot prio = Hash(i \oplus t) \oplus i \quad \text{(Eq. 3)}$$

where t is the instant time, the function Hash(x) is a fast message digest generator that returns a random integer in range [0, M) by hashing the input value x, and the sign '⊕' is designated to carry out a concatenation operation on its two operands. Because a priority is appended to an identifier of each node, Eq. 3 guarantees that the priority number for each node is unique. If node i's priority is the highest among M neighbors, it is therefore guaranteed that node i can transmit without contention and collision. Hence, NAMA provides distributed scheduling with low overhead for channel access.

Figure 2:
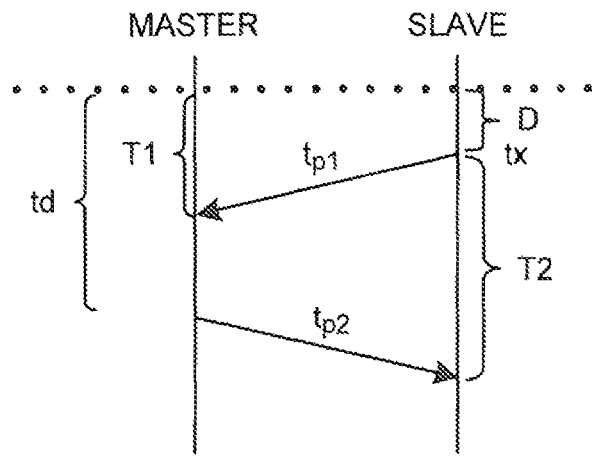
FIG. 2 illustrates a two-way message exchange in a basic scheme for time synchronization.

When a node receives a topology message at time T1, a timestamp of T1 (see FIG. 2 and related text) may then be combined into each topology message and a significant reduction in bandwidth can be accomplished for network time synchronization. The time td in FIG. 2 can be implicitly deduced because, for the time-slotted network frames, td is always referenced to the defined slot boundaries.

Therefore, a master node with M slave nodes needs to send only one topology message that includes M timestamps, after the master receives topology messages from all of the M slaves. That is, only M+1 messages are needed to accomplish a complete two-way message exchange for all M nodes, rather than 2M messages as needed in the prior synchronization protocols. This results in a 50% overhead reduction independent of packet overhead considerations.

Due to the randomness of the Hash(·) function in Eq. 3, messages could be received out of order with time lapses between the slave topology messages and the master's message. Since clock skew will accumulate with time, the impact of out-of-order messaging to time offset estimation has to be evaluated. By default, a topology message is sent every second on average, and a master node's topology message lags a slave node's topology message by one second. If the required clock accuracy is 20 ppm for all nodes, the time difference between two nodes may increase by up to 40 us over the one second duration. This issue is addressed further below.

CLANS Protocol for Time Synchronization

As mentioned, after the coarse synchronization is performed, the time offsets between the master and the slave nodes is less than one-half of the slot size, or $|t_r(k)|<$SLOT_SIZE/2. The following description assumes that timestamps are given relative to a determined slot boundary.

Figure 3:
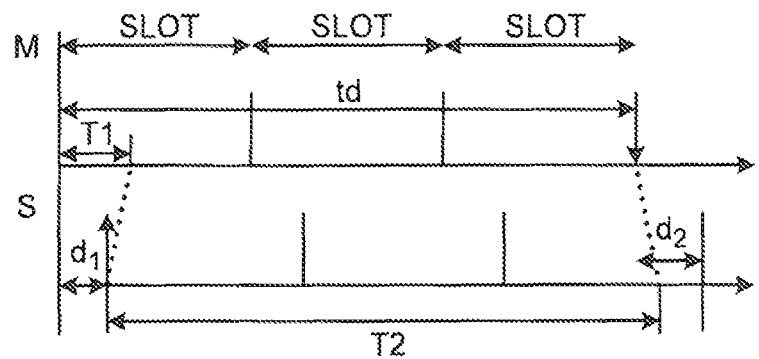
FIG. 3 is a graph illustrating a clock skew estimation according to the invention.

In slotted systems such as TDMA, td is the duration of an integer number of time slots. The reference time of T1 and T2 is the slot boundary. For the example given in FIG. 3, the time of T1 is referenced to the slot boundary as determined by master node M, and the time T2 is referenced to the slot boundary as determined by slave node S and the latter's timing offset $d_1$. Using the NAMA protocol, two-way messages are separated by some slots, as seen in FIG. 3. In the figure and in the following description, M and S denote master and slave nodes, and vertical lines with arrowheads represent message transmissions. Relations among T1, T2, td and time offset can then be written as in Eqs. 4, below;

$$T_1 = d_1 + t_p$$

$$d_2 = d_1 + \Delta f \times td$$

$$T_2 = td - d_2 + t_p \quad \text{(Eq. 4)}$$

where $\Delta f = f_S - f_M$; $f_S$ is the slave clock rate, and $f_M$ is the master clock rate.

Using Eq. 2, a time offset estimation can be obtained from $$D = \frac{1}{2}(T_1 + td - T_2) \quad \text{(Eq. 5)}$$
$$= \frac{1}{2}(d_1 + d_2)$$
$$= d_1 + \frac{1}{2}\Delta f \times td$$

or $$d(k) = D(k) - \frac{1}{2}\Delta f \times td(k) \quad \text{(Eq. 6)}$$

Figure 4:
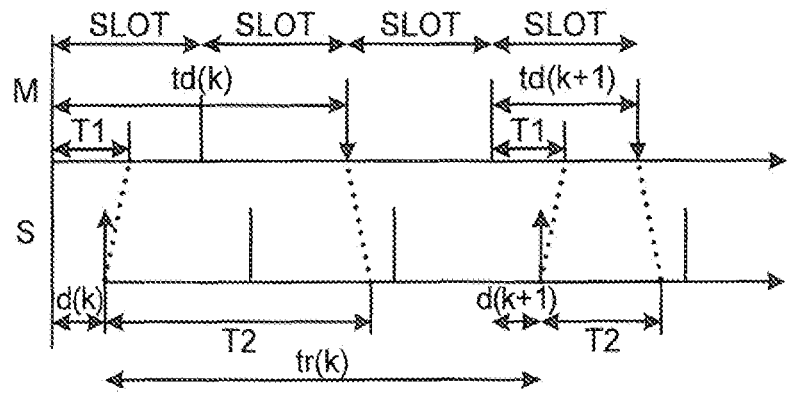
FIG. 4 is a graph clock skew estimation based on a transmission (Tx) order of slave (S) and master (M) nodes according to the invention.

From two estimations on D, and as shown in FIG. 4, $$D(k) = d(k) + \frac{1}{2}\Delta f \times td(k) \quad \text{(Eq. 7)}$$
$$D(k+1) = d(k+1) + \frac{1}{2}\Delta f \times td(k+1)$$

and relations between d(k) and d(k+1) as in Eq. 4, we can obtain $$d(k+1) = d(k) + \Delta f \times t_r(k) \quad \text{(Eq. 8)}$$

The difference in clock skew and time offset can be estimated as $$\Delta f = \frac{D(k+1) - D(k)}{t_r(k) + \frac{1}{2}(td(k+1) - td(k))} \quad \text{(Eq. 9)}$$
$$d(k+1) = D(k+1) - \frac{1}{2}\Delta f \times td(k+1)$$

where $\Delta f = f_S - f_M$. With the traditional two-way handshake, td is quite small so that $\Delta f \times td$ can be omitted in Eqs. 4 to 6, which simplifies the estimate to $d(k) \approx D(k)$. If measurement precision must be within 1 us using clocks with accuracy of 20 ppm, then the relation $d(k) \approx D(k)$ holds true only if td<25 ms because max $|\Delta f|$=40 ppm.

Figure 5:
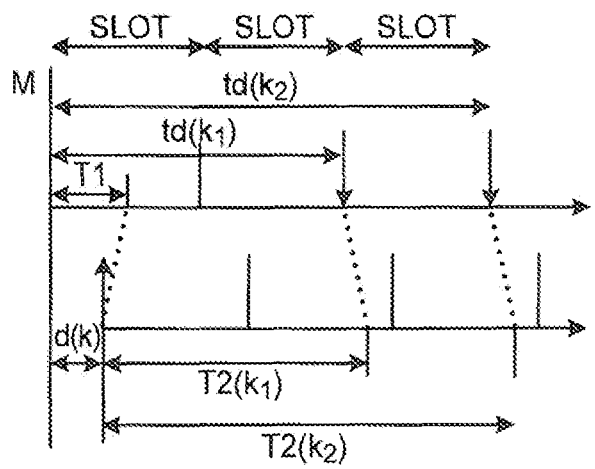
FIG. 5 is a graph as in FIG. 4, based on a Tx order of S, M, and M nodes according to the invention.

The above algorithm is based on a transmission order of slave and master, referred to herein as S-M. Because of the randomness of NAMA scheduling, another transmission pattern may occur, viz., S, M, . . . , M, or multiple master transmissions in successive slots following a slave transmission in an earlier slot, as depicted in FIG. 5 and referred to as S-M-M. In S-M-M, Eq. 7 becomes $$D(k_1) = d(k) + \frac{1}{2}\Delta f \times td(k_1) \quad \text{(Eq. 10)}$$
$$D(k_2) = d(k) + \frac{1}{2}\Delta f \times td(k_2)$$

$\Delta f$ and d(k) are estimated by using $$\Delta f = \frac{2[D(k_2) - D(k_1)]}{td(k_2) - td(k_1)} \quad \text{(Eq. 11)}$$
$$d(k) = D(k_i) - \frac{1}{2}\Delta f \times td(k_i)$$

where $D(k_i)$ can be obtained using Eq. 2.

For a transmission pattern S1, . . . , Sn, M; only the Sn-M pair is used for estimation in the same way as in S-M.

Estimation when Slave Adjusts Time

When a time difference between a master and a slave increases beyond a predefined threshold, the slave node needs to realign its time to the master node's time. This adjustment can be calculated from the estimates of clock skew and time offset. If time offset is obtained at tx(k) and the next transmission time is tx(k+1), the clock drift at the new time would be $$d_{k+1} = d_k + \Delta f \cdot [tx(k+1) - tx(k)] \quad \text{(Eq. 12)}$$

Figure 6:
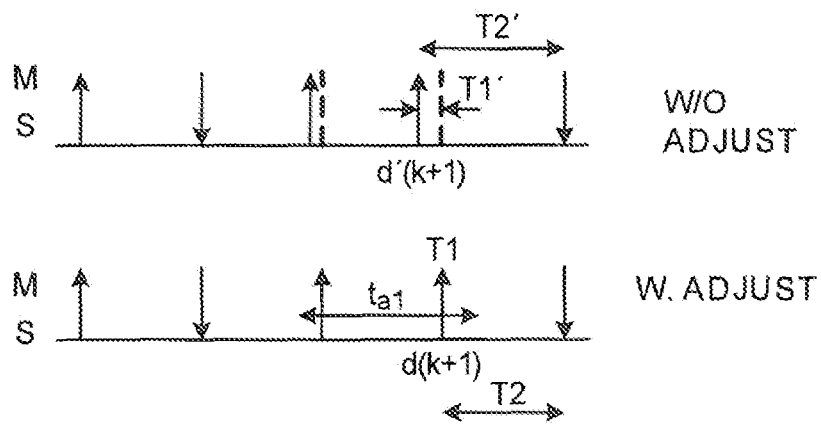
FIG. 6 is a graph illustrating adjustment of time by a slave node.

The slave then adjusts its timing accordingly by $t_{adj} = -d_{k+1}$ so that it transmits at a slot boundary. The time adjustment $t_{adj}$ is defined as that shown in FIG. 6, in which T1', T2' and d'( ) are the variables before adjustment, and T1, T2 and d( ) are the variables after adjustment. In this example, $\Delta f > 0$. Hence, d(k)>0 and $t_{adj}<0$. For the same reason, we have T1'<0 and |T1|<|T1'|, or T1'<T1; and T2'>T2. This relationship can be formulated as $$T1' = T1 + t_{a1}$$
$$T2' = T2 - t_{a1} \quad \text{(Eq. 13)}$$

From Eq. 13, we have $$D(k+1) = \frac{T1 + td - T2}{2} \quad \text{(Eq. 14)}$$
$$= \frac{T1' + td - T2'}{2} - t_{a1}$$
$$= D'(k+1) - t_{a1}$$

or $$D'(k+1) = D(k+1) + t_{a1} \quad \text{(Eq. 15)}$$

Figure 7:
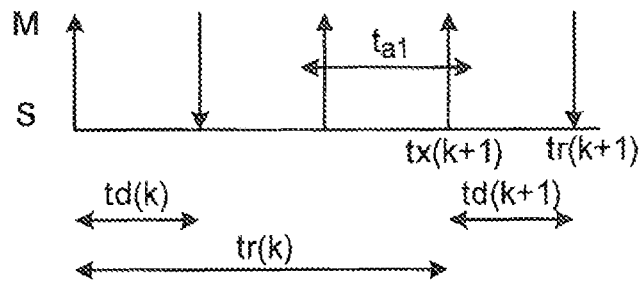
FIG. 7 is a graph illustrating estimation when a slave time is adjusted.

It can be shown that Eq. 15 is true for $\Delta f < 0$. Therefore, when the slave adjusts its time at transmission time tx(k+1), the adjustment must account for in clock skew estimation at receiving time tr(k+1), as shown in FIG. 7.

For a transmission pattern of S-M, Eq. 9 becomes $$D'(k+1) = D(k+1) + t_{a1} \quad \text{(Eq. 16)}$$
$$\Delta f = \frac{D'(k+1) - D(k)}{t_r(k) + \frac{1}{2}(td(k+1) - td(k))}$$

where $$t_{a1} = \sum_{t_i \subseteq tr(k)} t_{adj}(t_i).$$

An estimate of time offset at tx(k+1) can then be calculated by using $$d(k+1) = D(k+1) - \frac{1}{2}\Delta f \times td \quad \text{(Eq. 17)}$$

Because in the transmission pattern S-M-M the slave node does not transmit after one transmission, no modification is needed in the estimation of clock skew and time offset.

Estimation in a Lossy Environment

Due to the unreliable nature of a wireless channel, packet losses will unavoidably occur. Packet loss can be converted into four categories shown in FIGS. 8(a) to 8(d).

Figure 8:
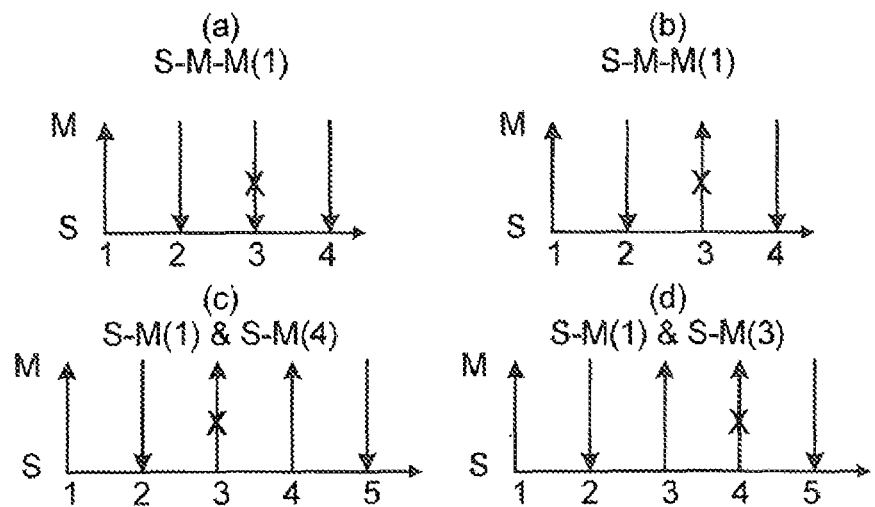
FIG. 8 is a graph illustrating packet loss patterns.

In FIG. 8(a), a slave node fails to receive the master node's message at a time 3. In FIGS. 8(b) to 8(d), the master node fails to receive the slave node's transmission at a time 3 or 4.

The FIG. 8(a) case can be treated as transmission pattern S-M-M, with reference to time point 1. The case in FIG. 8(b) occurs when the master does not receive a packet at time=3, but does receive one at time=1. This is equivalent to the S-M-M pattern with reference to time=1.

In the case of FIG. 8(c), the master receives a packet at time=4 regardless of whether or not it receives one at time=3. This is the same transmission pattern as S-M with reference to time=4.

In FIG. 8(d), the master fails to receive a packet at time=4 and receives one at time=3, which is equivalent to the transmission pattern S-M with reference to time=3.

Because neither the master nor the slaves can differentiate packet loss from out-of-order message transmissions, a frame number (FN) and a slot number (SN) are needed in the master's timing message to indicate the reference. The two parameters are defined for each slave.

Estimation when Slave Adjusts Time with Packet Loss

Figure 9:
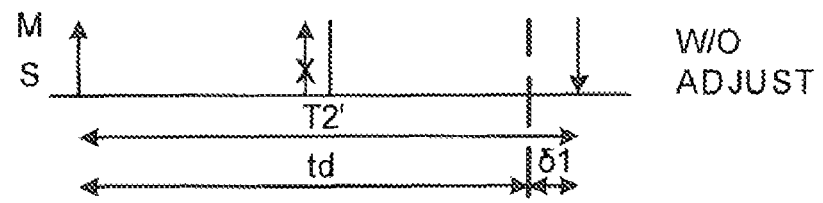
FIG. 9 shows graphs illustrating compensation for an estimate (D) at a reference time (T2) according to the invention.
Figure 9:
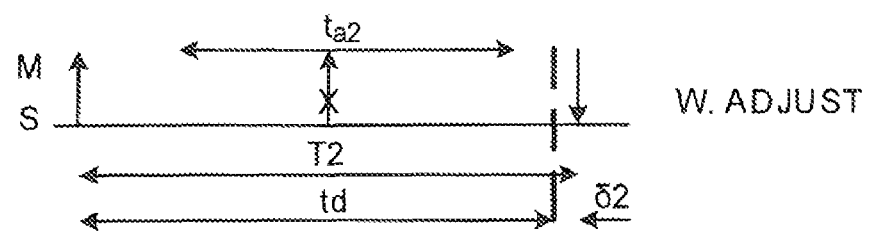

Slave time estimation in a lossy environment is more complex than a simple combination of the previous two cases. An example is given in FIG. 9 to illustrate how to compensate in a typical case wherein the master fails to receive one transmission from a slave. The top and the bottom graphs depict timing without slave time adjustment and with slave time adjustment, respectively. In FIG. 9, the solid line without arrow and the dashed line without arrow denote the master's time and the slave's time of slot boundary respectively. It is noted that td is measured in number of slots; therefore, although it has different lengths in the two cases, the same value is used in calculating D( ) and D'( ).

In this example, $\Delta f > 0$, which results in $t_{a2} < 0$. It can be seen from FIG. 9 that $$T'_2 = td + \delta_1$$

$$T_2 = td + \delta_2 \quad \text{(Eq. 18)}$$

Because $\delta_1, \delta_2 > 0$, $\delta_1 > \delta_2$ and $t_{a2} < 0$, then $\delta_2 = \delta_1 + t_{a2}$.

Consequently, $$\begin{aligned} T'_2 &= td + \delta_1 \\ &= td + \delta_2 - t_{a2} \\ &= T_2 - t_{a2} \end{aligned} \quad \text{(Eq. 19)}$$

T2 is obtained from measurement, and T2' should be used to calculate D( ) in Eq. 2. For slaves that are direct neighbors of the network master node, estimation can be summarized as in Eq. 20, below.

$$\begin{cases} T2'(k+1) = T2(k+1) - t_{a2} \\ D(k+1) = \dfrac{T1(k+1) + td(k+1) - T2'(k+1)}{2} \\ D'(k+1) = D(k+1) + t_{a1} \\ \Delta f = \dfrac{D'(k+1) - D(k)}{t_r(k) + \dfrac{1}{2}(td(k+1) - td(k))} \\ d(k+1) = D(k+1) - \dfrac{1}{2}\Delta f \cdot td(k+1) \end{cases} \quad \text{(Eq. 20)}$$

Estimation when Both Master and Slave Adjust Time with Packet Loss

In the following case, assume that there is a single master in the network, called the network master. The network master does not change its time. Slaves that are hop-n away from the network master, however, synchronize to slaves of hop-(n−1) away from the network master. The latter thus act as secondary masters to the former (or their next hop nodes). When the secondary masters adjust their time, their slaves need to take the adjustment into their own processing accordingly.

Since a master node does not rely on any of its slaves' time, a failure by the master node to receive a slaves' transmission will not affect the master node's time. If slave nodes fail to receive their secondary masters' announcement of time adjustment, however, an error is introduced into the slaves' estimations. An example is provided in FIG. 10 to illustrate this point.

Figure 10:
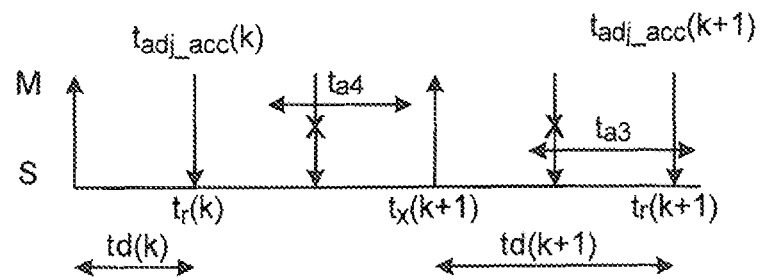
FIG. 10 is a graph illustrating a loss of a master's packet.

In FIG. 10, slaves fail to receive the master's message, which reflects errors in the instant timestamps at tr(k+1). Similar to estimation in a slave's time adjustment, $t_{a3}$ and $t_{a4}$ affect estimates of D( ) and $\Delta f$. In order to obtain their values in a lossy environment, two new parameters are added into the timing message, namely, accumulated time adjustment $t_{adj\_acc}$, and $t_{a3}$. Parameter $t_{adj\_acc}$ is measured per timing message and accumulated as long as the node adjusts its time. The parameter $t_{a3}$ is accumulated for each slave since the time when a master (or the secondary masters) receives its (or their) slaves' timing message (tx(k+1) in FIG. 10). The parameter $t_{a4}$ can then be derived with $$t_{a4} = t_{adj\_acc}(k+1) - t_{adj\_acc}(k+1) - t_{a3} \quad \text{(Eq. 21)}$$

Figure 11:
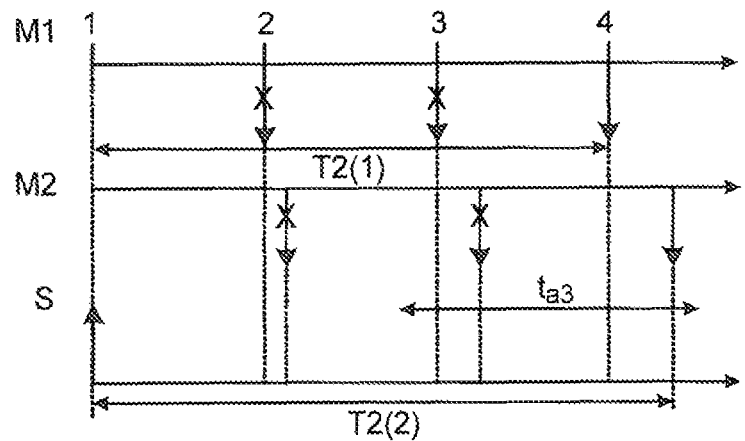
FIG. 11 is a graph illustrating a master's time change with a packet loss and compensation at time T2.

When deriving D, $\Delta f$ and d( ) the parameters $t_{a3}$ and $t_{a4}$ must be compensated. FIG. 11 shows how the processing works. In the figure, M1 and M2 denote a master with and without time adjustment.

$$T2' = T2 + t_{a3} \quad \text{(Eq. 22)}$$

$$D(k+1) = \dfrac{T1 + td(k+1) - T2'}{2}$$

$$D'(k+1) = D(k+1) - t_{a4}$$

$$\Delta f = \dfrac{D'(k+1) - D(k)}{tr(k) + \dfrac{1}{2}(td(k+1) - td(k))}$$

Figure 12:
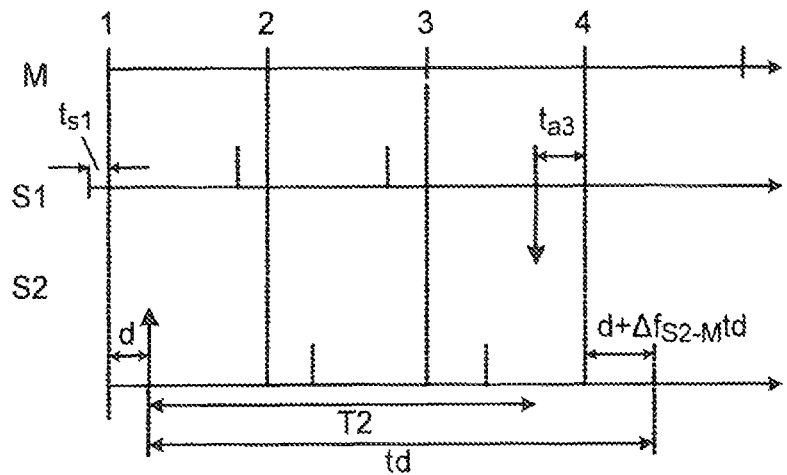
FIG. 12 is a graph illustrating estimation when both a master and a slave adjust time.

FIG. 12 depicts the timing relationship between a master M, a 1-hop slave S1, and a 2-hop slave S2, wherein S1 is a secondary master of S2. In deriving S2's d( ), the following relationships may be used:

$$T_1 = d - t_{S1} \quad \text{(Eq. 23)}$$
$$t_{a5} = -(t_{S1} + \Delta f_{S1-M} td)$$

$$T_2 = td - (d + \Delta f_{S2-M} td - (t_{S1} + \Delta f_{S1-M} td)) \quad \text{(Eq. 24)}$$
$$= td - (d - t_{S1} + \Delta f_{S2-S1} td)$$

where $T_1$, $T_2$ and d are referenced to S1's timing, S2's timing and M's timing. The subscripts for t and Δf also denote corresponding nodes. D can be obtained from $T_1$ and $T_2$, as $$D = \frac{T_1 + td - T_2}{2} = d - t_{S1} + \frac{1}{2}\Delta f_{S2-S1} td \quad \text{(Eq. 25)}$$

In an S-M pattern $$d = D - t_{a3} - \frac{1}{2}\Delta f_{S2-S1} td - \Delta f_{S1-M} td \quad \text{(Eq. 26)}$$

and in a S-M-M pattern $$d = D - \sum t_{a3} - \frac{1}{2}\Delta f_{S2-S1} td - \Delta f_{S1-M} td \quad \text{(Eq. 27)}$$

Although S2 can only estimate $\Delta f_{S2-S1}$, $\Delta f_{S2-M}$ can also be derived if S1's estimates of clock skew relative to the master $\Delta f_{S1-M}$ is broadcast in S1's topology message, because $$\Delta f_{S2-M} = \Delta f_{S2-S1} + \Delta f_{S1-M} \quad \text{(Eq. 28)}$$

Performance Analysis

Overhead

Figure 13:
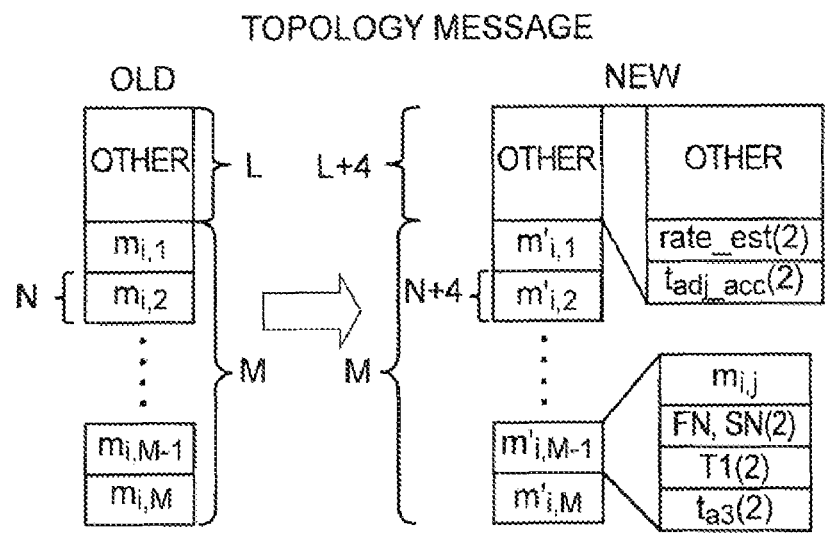
FIG. 13 is a schematic block diagram illustrating a network topology message according to the invention.

FIG. 13 depicts a topology message without time synchronization at the left side of the figure (Old), and the same topology message with time synchronization added at the right side (New). The old topology message is divided into two portions, one of which is related to topology and the other related to overhead. The topology related portion has M entries, one for each 1-hop neighbor, and each entry is comprised of N bytes. The overhead portion comprises L bytes.

In the new topology message format at the right in FIG. 13, additional data is appended to portions of the old message format at the left in order to perform time synchronization among the network nodes. Six bytes are added for each of the M entries, viz. two bytes for frame number (FN) and slot number (SN) to derive td, two bytes for a timestamp T1, and two bytes for time adjustment since a slave transmission ($t_{a3}$ in FIG. 10). Four bytes are added in the overhead portion; two bytes for the clock skew estimate ($\Delta f_{S1-M}$ in Eqs. 26 to 28), and two bytes for the time adjustment ($t_{adj\_acc}$ in FIG. 10). The incremental overhead needed for time synchronization is then given by $$\Delta \text{ overhead } (\%) = \frac{6M + 4}{NM + L} \quad \text{(Eq. 29)}$$

Further overhead reduction can be achieved by dividing 1-hop neighbors into two groups; namely, one for master and peers, and one for slaves. In such case, timing information need only be sent to the slaves.

Results

Simulations were aimed to evaluate performance of the inventive CLANS protocol in terms of estimation accuracy. A ten node scenario was simulated with random varying clock accuracy in the range of [−20 ppm, +20 ppm], initial time offset to slot boundary of (−3 ms, +3 ms) with TDMA message transmission, and a frame size of one second consisting of 200 slots each of 5 ms duration. Fifteen slots at the end of each frame were reserved for topology messages, and NAMA was implemented for distributed access control. With such a configuration, 1.5 topology messages are transmitted per second and each node sends 1.5 messages, on average, per second.

Measurement noise and rounding noise were applied to T1 and T2 to reflect hardware imperfection in real implementation. Measurement noise consisted of additive white Gaussian noise (AWGN) with σ=0.5 us and

TABLE 2

Parameters of Filters

| | | $\alpha_1$ | $\alpha_2$ |
|---|---|---|---|
| 1-hop nodes | Δf | $\alpha_1 = 1/128.0$, for k < 100 | $\alpha_2 = 1/2048.0$, for k ≧ 100 |
| 2-hop nodes | Δf | $\alpha_1 = 1/32.0$, for k < 100 | $\alpha_2 = 1/1024.0$, for k ≧ 100 |
| | d( ) | $\alpha_1 = 1/4.0$, for 20 ≦ k < 200 | $\alpha_2 = 1/2042.0$, for k ≧ 200 | measurement granularity (rounding noise) of 0.5 us, typical in Linux platforms. Packet loss for each topology message was random at a rate of 8%.

The simulation consisted of a single network time master, 1-hop slaves that adjusted their time to synchronize to the master's time, and 2-hop slaves that adjusted their time to align to the master's time according to the 1-hop slaves' time plus their clock skew estimates and time adjustments. A simple low-pass filter, given in Eq. 30), was used to smooth out noise effect on estimates of both Δf and d( ).

$$\hat{x}(k+1) = f(x, \hat{x}, k) = \alpha \cdot x(k) + (1-\alpha) \cdot \hat{x}(k) \quad \text{(Eq. 30)}$$

where x and $\hat{x}$ denote a new estimate and an average estimate. Two-stage filtering was applied to obtain estimates with both fast convergence and good accuracy. Parameter α in Eq. 30 was selected according to Table 2, above. Time adjustment was based on estimates of clock skew Δf̂ and time offset d̂(k), as stated in Eq. 12.

Figure 14:
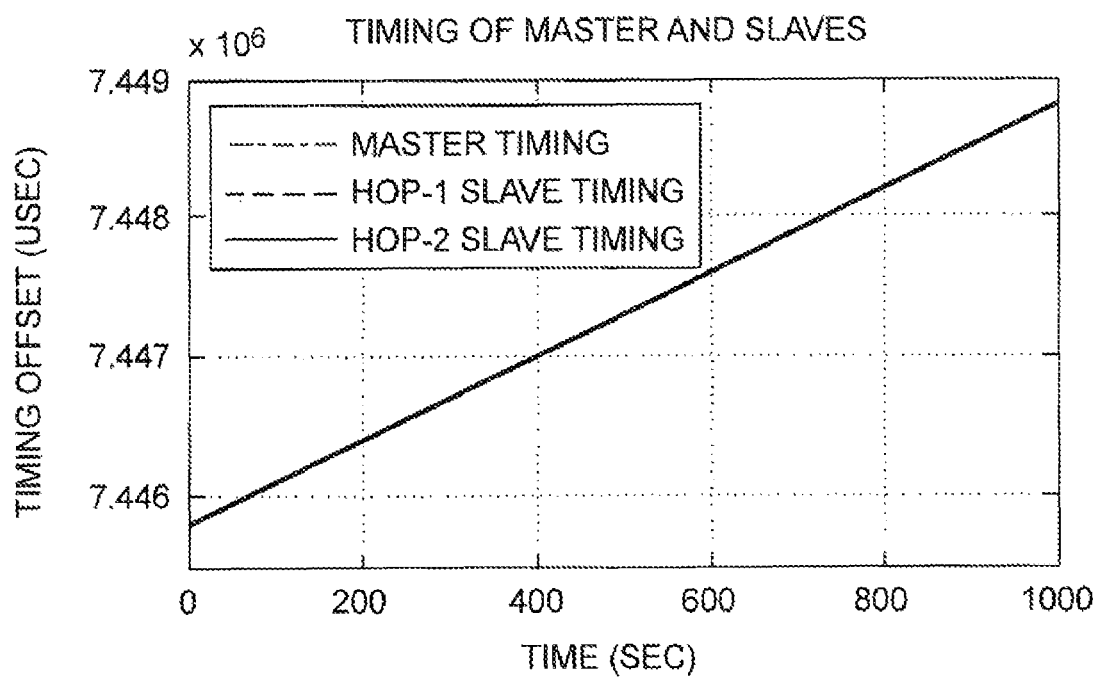
FIG. 14 is a graph illustrating timing of a master and slave nodes according to the invention.

FIG. 14 depicts timing of the master, one 1-hop slave, and one 2-hop slave. The 2-hop slave used the time offset and clock skew estimates of the 1-hop slave to synchronize to the master's time. Timing of 1000 seconds was given. Maximum time offset was below 1 us.

Figure 15:
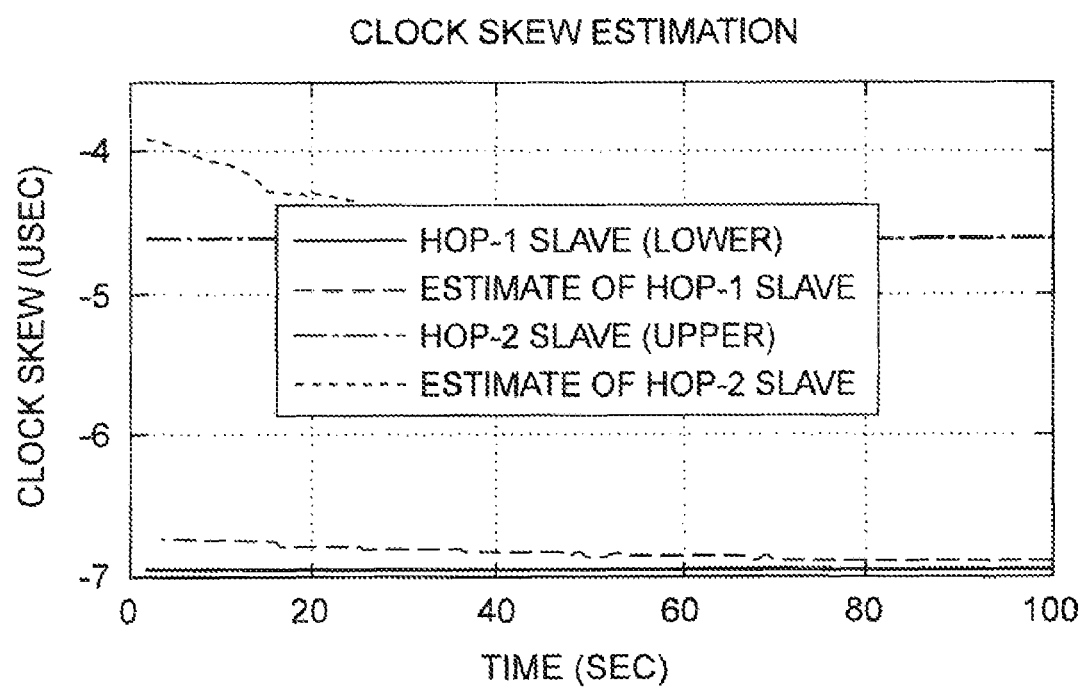
FIG. 15 is a graph illustrating clock skew estimation up to 100 seconds according to the invention.
Figure 16:
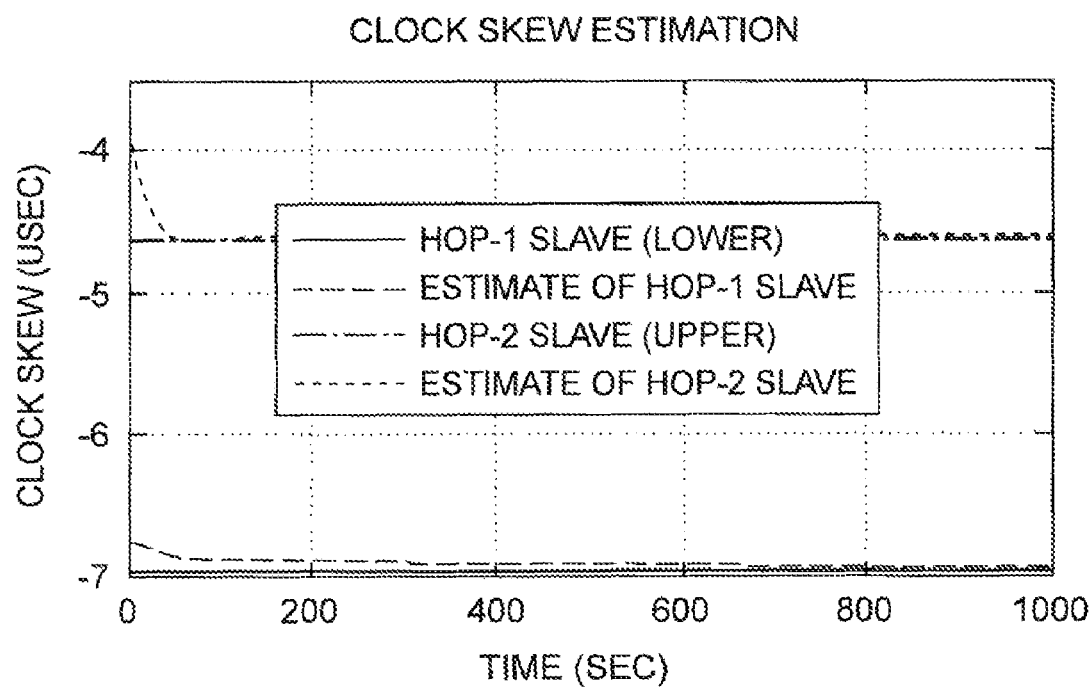
FIG. 16 is a graph illustrating clock skew estimation up to 1000 seconds according to the invention.

FIGS. 15 and 16 show clock skew estimates for 1-hop and 2-hop slaves. FIG. 15 shows clock skew estimates within 100 seconds, and FIG. 16 depicts estimates within 1000 seconds. The cases converge to 0.5 us accuracy in less than 20 seconds. Accuracy for both of the 1-hop and the 2-hop slaves is within 0.05 us after convergence into a stable state.

As demonstrated herein, the inventive CLANS protocol enables low cost time synchronization in a tactical MANET environment, with minimal impact to existing network architecture. CLANS avoids a dramatic increase in operational overhead by using a cross-layer approach that leverages existing scheduling and routing protocols. This is particularly important for MANETs with high traffic loads, where it is imperative not only to maintain time synchronization but also to update routing tables periodically while controlling overhead. And while CLANS may require customization to account for underlying routing and channel access protocols, the protocol provides an affordable system solution capable of withstanding the rigors of a tactical MANET environment without stressing existing hardware.

While various embodiments of the invention are disclosed herein, it will be understood by those skilled in the art that various changes, additions and modifications may be made without departing from the spirit and scope of the invention. For example, global positioning satellite (GPS) units may be deployed in a CLANS network to increase the effectiveness of the inventive protocol by using an intermittently available time reference in an opportunistic manner. Accordingly, the invention includes all such changes and modifications that lie within the scope of the following claims.

We claim:

1. A method of obtaining synchronization among nodes in a wireless mobile ad hoc network (MANET), comprising:
   maintaining, at a given node of the network, a routing table containing entries corresponding to other nodes of the network that are one or more hops away from the given node;
   periodically exchanging topology messages among nodes of the network for updating the routing tables at each of the nodes of the network;
   selecting a network master node, and defining remaining nodes that are one or more hops away from the network master node as slave nodes;
   including master timing information in topology messages transmitted by the network master node, wherein the master timing information corresponds to first times (T1) at which the network master node received a topology message from each of the slave nodes, and a second time (td) at which the network master node sends a topology message after receiving the topology messages from each of the slave nodes; and
   implementing a distributed scheduling protocol for transmitting the topology messages from each of the slave nodes in order to resolve contention for channel access among each of the nodes of the network.

2. The method of claim 1, including selecting a node activation multiple access (NAMA) protocol as the distributed scheduling protocol.

3. A method of obtaining synchronization among nodes in a wireless mobile ad hoc network (MANET), comprising:
   maintaining, at a given node of the network, a routing table containing entries corresponding to other nodes of the network that are one or more hops away from the given node;
   periodically exchanging topology messages among nodes of the network for updating the routing tables at each of the nodes of the network;
   selecting a network master node, and defining remaining nodes that are one or more hops away from the network master node as slave nodes;
   including master timing information in topology messages transmitted by the network master node, wherein the master timing information corresponds to first times (T1) at which the network master node received a topology message from each of the slave nodes, and a second time (td) at which the network master node sends a topology message after receiving the topology messages from each of the slave nodes; and
   providing a given slave node with a controller or processor for determining a time offset estimation (D) according to the master timing information in a topology message received by the given slave node from the network master node.

4. The method of claim 3, including configuring the controller or processor at the given slave node to determine the time offset estimation (D) according to $D=(\frac{1}{2})(T1+td-T2)$ wherein T2 corresponds to a time at which the given slave node received the master timing information.

5. A method of obtaining synchronization among nodes in a wireless mobile ad hoc network (MANET), comprising:
   operating the network according to a time domain multiple access (TDMA) protocol having time slots of a determined size available for transmissions from the nodes;
   maintaining, at a given node of the network, a routing table containing entries corresponding to other nodes of the network that are one or more hops away from the given node;
   periodically exchanging topology messages among nodes of the network for updating the routing tables at each of the nodes;
   implementing a distributed scheduling protocol for transmitting the topology messages in order to resolve contention among the nodes of the network for access to the time slots;
   selecting a network master node, and defining remaining nodes that are one or more hops away from the master node as slave nodes; and
   including master timing information in topology messages transmitted by the network master node, wherein the master timing information corresponds to first times (T1) at which the network master node received a topology message from each of the slave nodes, and a second time (td) at which the network master node sends a topology message after receiving the topology messages from the slave nodes.

6. The method of claim 5, including selecting a node activation multiple access (NAMA) protocol as the distributed scheduling protocol.

7. The method of claim 5, including providing a given slave node with a controller or processor for determining a time offset estimation (D) according to the master timing information in a topology message received by the slave node from the given, network master node.

8. The method of claim 7, including configuring the controller or processor at the given slave node to determine the time offset estimation (D) according to $D=(\frac{1}{2})(T1+td-T2)$ wherein T2 corresponds to a time at which the given slave node received the master timing information.

9. The method of claim 7, including implementing a coarse network time synchronization among the nodes of the network before including the master timing information in the topology messages transmitted by the network master node.

10. The method of claim 9, including configuring the controller or processor at the given slave node to determine the time offset estimation when a topology message exchange between the given slave and the network master nodes is completed over a time greater than the size of one time slot.

* * * * *